(12) United States Patent
Van Ee

(10) Patent No.: US 6,937,972 B1
(45) Date of Patent: Aug. 30, 2005

(54) FULLY FUNCTIONAL REMOTE CONTROL EDITOR AND EMULATOR

(75) Inventor: Jan Van Ee, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/271,200

(22) Filed: Mar. 17, 1999

(51) Int. Cl.$^7$ .................................. G06F 3/00
(52) U.S. Cl. ........................... 703/20; 229/320
(58) Field of Search ................. 703/25, 26, 20, 703/23–24; 719/310, 311, 320, 322, 327

(56) References Cited

U.S. PATENT DOCUMENTS

| | | | | |
|---|---|---|---|---|
| 5,291,587 A | * | 3/1994 | Kodosky et al. | 395/703 |
| 5,623,592 A | * | 4/1997 | Carlson et al. | 345/348 |
| 5,819,294 A | | 10/1998 | Chambers | |
| 5,841,975 A | * | 11/1998 | Layne et al. | 709/203 |
| 6,085,236 A | * | 7/2000 | Lea | 709/220 |
| 6,208,384 B1 | * | 3/2001 | Schultheiss | 348/552 |
| 6,211,870 B1 | * | 4/2001 | Foster | 345/333 |
| 6,317,706 B1 | * | 11/2001 | Saib | 703/27 |
| 6,359,636 B1 | * | 3/2002 | Schindler et al. | 345/846 |
| 6,384,737 B1 | * | 5/2002 | Hsu et al. | 340/825.69 |

FOREIGN PATENT DOCUMENTS

EP    0779572 A2    6/1997    ............. G06F/3/00

* cited by examiner

*Primary Examiner*—Meng-Al T. An
*Assistant Examiner*—George Lawrence Opie
(74) *Attorney, Agent, or Firm*—Dicran Halajian

(57) ABSTRACT

A universal programmable remote control device has programmability functions that enable the end-user to customize the device through editing or programming the device's control functionalities. The programming can be achieved via a PC. The control configuration created via an editor on the PC can be downloaded into the device. The PC has emulator software to test the configuration before downloading. The emulator software and the remote's control software are made identical as a consequence of a software layer that abstracts from the remote's hardware. The emulator for the end-user is thus obtained as an almost free byproduct of the software development phase at the manufacturer.

15 Claims, 1 Drawing Sheet

FULLY FUNCTIONAL REMOTE CONTROL EDITOR AND EMULATOR

FIELD OF THE INVENTION

The invention relates to a system and method for programming or testing a programmable remote control device.

BACKGROUND ART

Ever increasingly more sophisticated electronic audio/video (AV) equipment and home automation equipment are being introduced on the consumer electronics (CE) market. Typically, the equipment is programmable by the end-user in order to tailor the numerous functionalities and settings to the individual preferences. The user-interactivity and synergy aspects of the equipment are determined substantially by software such as interactive applications, control software and GUI's. See, for example, to the HAVi architecture and the Home API initiative, both involving substantial contributions from Philips Electronics, the Jini technology of Sun Microsystems, Inc., etc. For more information on these technologies, see below.

A step forward in user-friendliness regarding interacting with the equipment is the universal programmable remote controller, such as the "RC-2000" of Marantz and the "Pronto" made by Philips Electronics. The term "universal remote" refers to a device that enables the end-user to control the majority of his/her collection of remotely controllable apparatus, regardless of the type or brand of the individual apparatus. This universal controllability is achieved by accommodating on the remote a data base of multiple sets of existing control (IR or RF) codes, each particular set being associated with a particular type of apparatus of a particular brand. In addition, the universal remote is programmable to learn or adopt new codes and to associate them with a particular user-defined input. The "Pronto", for example, has built-in RC-5 and RC-6 codes for Philips and Marantz equipment, IR-sending and IR25 learning eyes, and an RS232 serial port connector for after-market expandability, e.g., via ia PC. The "Pronto" provides a GUI via an LCD touch screen and also has direct-access buttons for frequently used control functions. Built-in are custoimizable device templates for full control; the options to assign control functions to icons or buttons; options to delete and create icons or buttons; to program and edit macros; a keyboard with soft keys for (re-) labeling buttons, icons and templates or the GUI's control panels. In short, the "Pronto" is highly customizable in terms of the GUI's lay-out, appearance, labeling, organization and in terms of programming and editing the control functions.

As to HAVi, see, e.g., the following copending applications incorporated herein by reference:

U.S. Ser. No. 08/731,624 filed Oct. 15, 1996, now U.S. Pat. No. 6,959,536, for Paul Chambers et al., for TASK-DRIVEN DISTRIBUTED MULTIMEDIA CONSUMER SYSTEM. This patent document relates to a control system with multiple consumer electronics devices and task-driven control means coupled to the devices for controlling an interaction among the devices. The control means acts on respective software representations of each respective one of the consumer devices. By encapsulating the variable complexity of the task within a software representation, it can be made as simple or as sophisticated as needed to bring the capabilities up to a common level. Since the level of interface is common to the devices, applications can uniformly manipulate devices which embody very different levels of sophistication.

U.S. Ser. No. 09/107,525 filed Jun. 30, 1998, now U.S. Pat. No. 6,163,817, for Gregory Gewickey and Yevgeniy Shteyn for DYNAMIC DE-REGISTERING OF DEVICES IN SYSTEM WITH MULTIPLE COMMUNICATION PROTOCOLS. This patent document relates to an information processing system has first and second electronic sub-systems, and control means for controlling the sub-systems. At least the first sub-system has a software representation registered with the control means. The control means changes a state of the first sub-system through interacting with the software representation. The first and second sub-systems are also capable of interacting directly with one another without the control means being involved. To avoid conflicts, at least the first sub-system is capable of de-registering with the control means so as to functionally disable its software representation at the control means).

U.S. Ser. No. 09/146,020 filed Sep. 2, 1998, now U.S. Pat. No. 6,199,136, for Yevgeniy Shteyn for LOW DATA-RATE NETWORK REPRESENTED ON HIGH DATA-RATE HAVi-NETWORK. This patent document relates to a PC-based home automation system that uses a low data-rate transport layer and COM-based software components for control of devices in a home automation network. The home automation system is merged with a messaging-based HAVi-network that uses IEEE 1394 as a high data-rate transport layer. The HAVi-network controls audio/video equipment in a home entertainment system. The home automation services and devices are registered as a HAVi-compliant elements with the HAVi network's FAV or IAV device. The home automation resources (devices and services) have both COM OLE Automation Interfaces and HAVI-compliant interfaces to permit control of the home automation system from the HAVi-network.

As to Home API, see, e.g., the following co-pending applications incorporated herein by reference:

U.S. Ser. No. 09/146,020 filed Sep. 2, 1998, now U.S. Pat. No. 6,199,136, for Yevgeniy Shteyn for LOW DATA-RATE NETWORK REPRESENTED ON HIGH DATA-RATE HAVi-NETWORK mentioned above.

U.S. Ser. No. 09/165,683, filed Oct. 12, 1998, now pending, for Yevgeniy Shteyn for CALLS IDENTIFY SCENARIO FOR CONTROL OF SOFTWARE OBJECTS VIA PROPERTY ROUTES. This patent document relates to an information processing system with first and second physical components represented by a first and second software objects. Both objects have properties that are changeable through calls to the objects. The system enables registering a property route linking a first-property of the first object to a second property of the second object so that a change in the first property causes the second call being issued to the second object upon invoking the property route. The input call to the first object comprises an identifier enabling to conditionally invoke the route. In this manner, routes belonging to different scenarios are being kept independent so that the system operates more reliable that without scenario identifiers.

U.S. Ser. No. 09/165,682 filed Oct. 2, 1998, now U.S. Pat. No. 6,434,447, for Yevgeniy Shteyn for CONTROL PROPERTY IS MAPPED ONTO MODALLY COMPATIBLE GUI ELEMENT. This patent document relates to an information processing system that has an electronic device and a controller for control of a functionality of the device. An abstract representation of the functionality is provided to the controller. The abstract representation exposes a modality of controlling the functionality. The controller enables controlling the functionality through interaction with the abstract representation. The modality controls associating the control of the functionality with a modally compatible controlling capability of the controller. The modality exposed can be, for example, "Boolean", "float", "integer array".

U.S. Ser. No. 09/213,527 filed Dec. 17, 1998, now U.S. Pat. No. 6,499,062, for Yevgeniy Shteyn for SYNCHRONIZING PROPERTY CHANGES TO ENABLE MULTIPLE CONTROL OPTIONS. This patent document relates to an information processing system whose components are represented by software objects, the properties of which can be changed through function calls. Setting a property of an object controls the associated component. Properties are connected through routes that propagate state changes throughout the system without the need for a running client application. Two-way property routes are used to keep consistence among a controlled object and multiple controlling objects without the risk of endless loops. To achieve this, the two-way route is executed to change a state of a specific one of the properties upon a change of state of another one of the properties if the change of state of the other property was caused by an effect other than the route itself.

As to PC networking, see, e.g., U.S. Ser. No. 09/133,622 filed Aug. 13, 1998, now U.S. Pat. No. 6,314,459, for Lawrence Freeman for HOME-NETWORK AUTOCONFIGURATION and incorporated herein by reference. This patent document relates to the automatic configuration of PC's in a (home) network in order to share resources registered at the individual PC's. Services and resources local to one PC are registered with the other PC and vice versa. The registry hides whether a service or resource is remote or local. In operational use of the network, a resource or service local to one PC is: addressable from the remote PC as if it were local to the latter. A home network of PC's is configured automatically in this manner.

As to some aspects of the "Pronto", see, e.g., the following co-pending applications, herein incorporated by reference:

U.S. Ser. No. 09/062,364 filed Apr. 17, 1998, now U.S. Pat. No. 6,211,856, for Jan van Ee and Cr Sung Choi for GRAPHICAL USER INTERFACE TOUCH SCREEN WITH AUTO ZOOM FEATURE. This patent document relates to a GUI with a touch screen having an entire collection of icons displayed at a scale in which the individual function of each icon is recognizable, but to small to easily access features of the function, and wherein upon touching the screen area accommodating an area of the icon, the screen provides a zoomed-in version of that area so that the user can select a desired feature.

U.S. Ser. No. 09/128,839 filed Aug. 4, 1998, now abandoned, for Jan Ee for REMOTE CONTROL HAS ANIMATED GUI. This patent document relates to A remote control device for remote control of home theater equipment has a display with a touch screen representing a GUI. User-activation of the GUI causes its appearance to change. The change is effected through animation. Animation is the simulation of movement created by displaying a series of bitmaps. The animation lets the user perceive the change as a smooth transition. Thus the impression is avoided of an abrupt confrontation with a new lay-out.

U.S. Ser. No. 09/129,300, now U.S. Pat. No. 6,208,341, filed Aug. 5, 1998 for Jan van Ee for GUI OF REMOTE CONTROL FACILITATES USER-FRIENDLY EDITING OF MACROS. This patent document relates to a remote control device for a home theater. The device has a macro creation/editing mode with authoring tools on the remote's GUI. One of the editing tools lets the user move a selected macro step visibly up or down the list of steps on the GUI.

As to customer support via the Internet, see the following co-pending applications incorporated herein by reference:

U.S. Ser. No. 09/160,490 filed Sep. 25, 1998, now abandoned, for Adrian Turner et al., for CUSTOMIZED UPGRADING OF INTERNET-ENABLED DEVICES BASED ON. USER-PROFILE. This patent document relates to a server system that maintains a user profile of a particular end-user of consumer electronics network-enabled equipment and a data base of new technical features for this type of equipment. If there is a match between the user-profile and a new technical feature, and the user indicates to receive information about updates or sales offers, the user gets notified via the network of the option to obtain the feature.

U.S. Ser. No. 09/189,535 filed Nov. 10, 1998, pending, for Yevgeniy Shteyn for UPGRADING OF SYNERGETIC ASPECTS OF HOME NETWORKS. This patent document relates to a server system with access to an inventory of devices and capabilities on a user's home network. The inventory is, for example, a look-up service as provided by HAVi or Jini architecture. The server has also access to a data base with information of features for a network. The server determines if the synergy of the apparatus present on the user's network can be enhanced based on the listing of the inventory and on the user's profile. If there are features that are relevant to the synergy, based on these criteria, the user gets notified.

OBJECT OF THE INVENTION

All of the above co-pending applications, the HAVI-spec, the Home API-spec and Jini-spec, illustrate the direction that CE equipment and home automation is taking. These documents also indirectly raise the issue of user-friendliness regarding controllability, reliability and accessability. How technically sophisticated the equipment may be, it will be of little use to the consumer if he/she cannot get it to do what he/she wants it to do and when he/she wants it be done. An ergonomically designed universal programmable remote controller, such as the "Pronto", may help to lower the acceptance-threshold for home theater and home automation systems, owing to the controller's user-friendliness, personalizing options and wide applicability.

On the other hand, programming and individualizing such a programmable remote is an exercise that requires time, accuracy and attention from the end-user. Verifying or testing the user-programmed functionalities is done only after the programming and in operational use of the remote.

It is an object of the invention to increase user-friendliness and ease-of-handling of a programmable remote by facilitating the programming and verification of the programmed control steps.

SUMMARY OF THE INVENTION

To this end, the invention provides a method of enabling programming a programmable remote control device for control of electronic equipment. The method comprises enabling running a software application on a computer for emulating manual programming of the device upon user input. The method further comprises enabling downloading into the device a result from the emulated manual programming. Preferably, the user is enabled to control the equipment from the computer upon the emulated programming in order to verify the programmed steps. This requires that the computer communicate with the equipment as if it were the remote. If the remote contains an IR or RF transmitter, the computer communicates through a similar IR-or RF transmitter, for example.

Preferably, the application comprises a visual editor for creating and editing a configuration of the remote. A configuration defines a user-interface with all its control functions for apparatus, macro groups, GUI panel lay-outs, button appearances and button behaviors. The graphic representation of the configuration provides, for example, a tree structure view of the overall configuration. A tree view is a graphical representation of a type of data structure, i.e., of a scheme for organizing related pieces of information, in which each element is attached to one or more elements directly beneath it. For example;

the remote is to control multiple apparatus in the home. Each specific apparatus has a plurality of controllable functionalities or properties. In the tree view, the properties of a specific apparatus are arranged underneath the associated device that itself is arranged underneath the home-cluster of apparatus. The graphical representation of the configuration provides, for example, also a panel view of the control panels as on the remote, including the hard buttons and the soft keys clustered in panels on the remote's GUI.

Preferably, the application comprises an emulator for graphically representing a model of the remote that allows user-interaction via suitable computer input means, such as a mouse, trackball or a keyboard. The emulator is a fully functional emulator of the remote control and behaves exactly like the 'real thing'. The emulator can therefore be used by end-users to quickly test configurations they have made for their 'real' remote control device. Without the use of an emulator, the configuration would have to be downloaded to the 'real' remote before it could be tested. This is a time-consuming process if the connection between the remote and a PC is relatively slow in view of saving costs (e.g., an RS232 link).

Preferably, the emulator is achieved by defining a software layer which abstracts from the actual hardware on which the remote's window manager (or UIMS) and application (control) are running. By implementing this layer on both a 'real' remote and a PC, the window manager and application sources can be compiled for both a 'real' remote and a PC. The emulator thus becomes an almost free byproduct of the 'real' remote's software development. Emulators are well known in the design and development stage of professional software creation and circuitry manufacturing.

BRIEF DESCRIPTION OF THE DRAWINGS

The invention is explained by way of example and with reference to the accompanying drawings, wherein.

PREFERRED EMBODIMENTS

Figure 1:
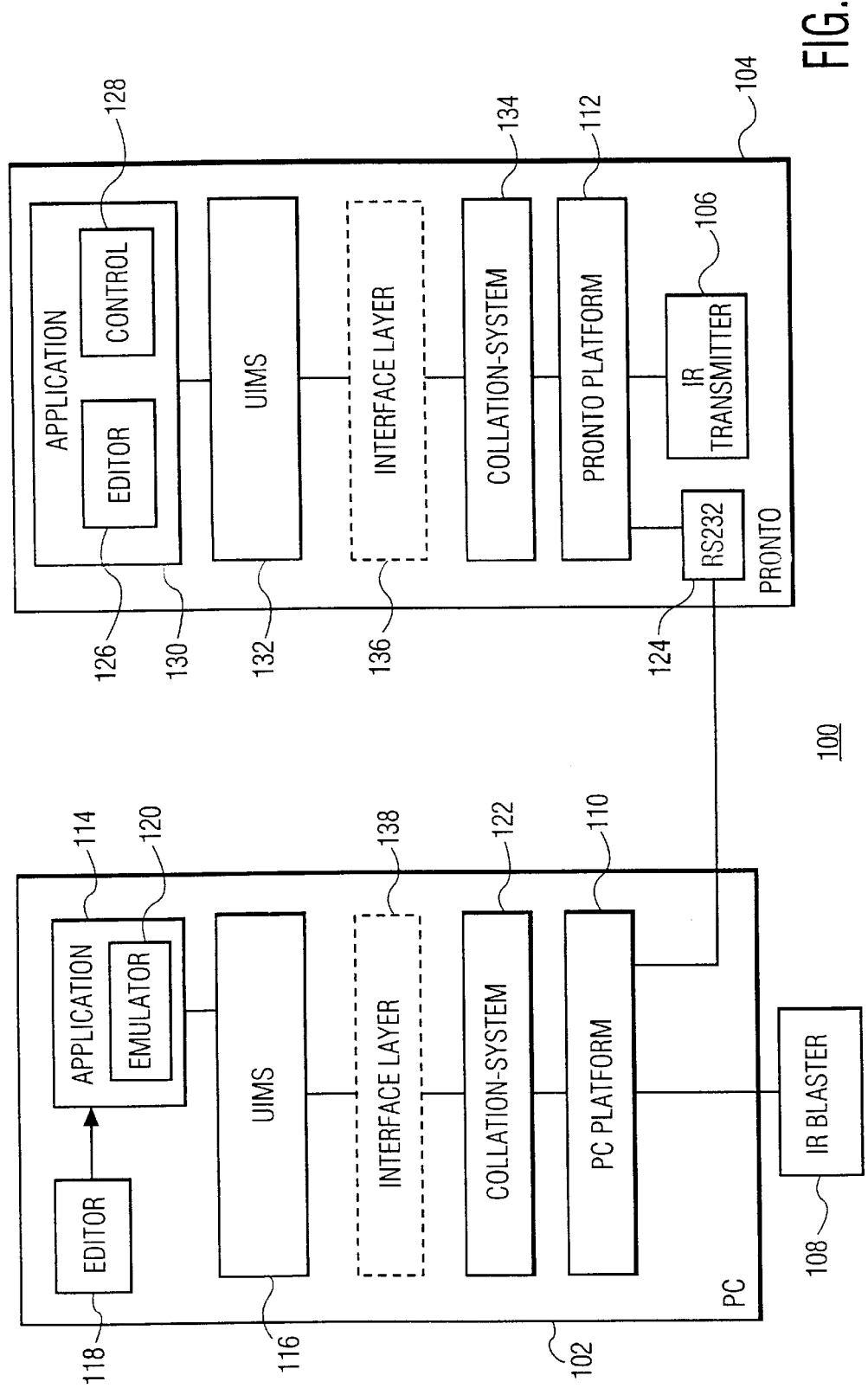
FIG. 1 is a block diagram of a system in the invention.

FIG. 1 is a block diagram with main components of an information processing system 100 in the invention. System 100 comprises a computer 102, here a PC, and a remote control device 104, here a "Pronto" of Philips Electronics, mentioned above. Device 104 is a user-programmable remote control with an IR-transmitter 106 for IR-control of electronics equipment (not shown) such as TVs, VCRs, CD players, DVD players, audio pre-amplifiers; tuners, etc. Computer 102 is connected to a further IR-transmitter 108. Both computer 102 and remote 104 have their own individual hardware platforms 110 and 112, respectively, that may be totally different in implementation.

The user loads an application 114 and a UI management system (UIMS) 116 (or windows manager) onto computer 102, e.g., via a CD-ROM, a diskette or via the Internet. UIMS 116 comprises a software library with high-level abstractions for implementing user interfaces. UI management systems are known in the art. Application 114 comprises an emulator 120. It is assumed that PC 102 has a visual editor 118.

Visual editor 118 enables the user to create and to edit a configuration of remote 104. A configuration defines a user-interface with all its control functions for apparatus, macro groups, GUI panel lay-outs, button appearances and button behaviors for remote 104. The graphic representation of the configuration provides, for example, a tree structure view of the overall configuration. A tree view is a graphical representation of a type of data structure, i.e., of a scheme for organizing related pieces of information, in which each element is attached to one or more elements directly beneath it. For example, remote 104 is to control multiple apparatus (not shown) in the home. Each specific apparatus has a plurality of controllable functionalities or properties. In the tree view, the properties of a specific apparatus are arranged underneath the associated device that itself is arranged underneath the home-cluster of apparatus. The graphical representation of the configuration provides, for example, also a view of the control panels as they appear on remote 104 when in the programming mode. A panel provides a cluster of soft keys whose functions are semantically associated with the device or property to be controlled.

Application 114 comprises an emulator 120 for graphically representing a model of remote 104 based on the configuration created through editor 1118. Emulator 120 allows user-interaction with a model of remote 104 rendered on the display (not shown) of computer 102 as if the model were the real 10I remote 104. User-interaction is achieved via suitable computer input means, such as a mouse, trackball or a keyboard (not known), as if it were real-life remote 104. For example, clicking the mouse when the cursor has been located over a hard key or soft key on the model of remote represented on the display of computer 102 triggers an event. The event causes computer 102, through a proper software system 122 for collation or otherwise managing of functions and through a driver (not shown), to generate the associated IR code transmitted via IR blaster 108. In this manner, the user is enabled to test user-programmed configurations directly via computer 102, rather than either having to program remote 104 itself directly, step for step, or to first download the programmed configuration from computer 102 into remote 104, e.g., via serial port 124, and test it thereupon. Serial port 124 is preferably a low-cost link (e.g. RS232). Accordingly, downloading a configuration created at computer 102 is a rather time-consuming process because of this relatively slow link between computer 102 and remote 104. Testing via computer 102 contributes to the user-friendliness of working with universal programmable remote controllers.

It is noted that computer 102 can be connected to remote 104 to use IR transmitter 106 of remote 104, rather than having a separate IR blaster 108.

The preferred embodiment of the invention adds to the above advantage a cost-effectiveness aspect. Remote 104, being a universal and user-programmable control device, has of course, editing and controlling functionalities 126 and 128, respectively, as specified above, bundled in an application 130. Editing and control functionalities 126 and 128 interact with platform 112 of remote 104 through a suitable UIMS 132 and collation system 134. Emulator 120 is now achieved as follows. A software interface layer 136 has been defined which abstracts from the actual hardware of remote 104 on which window manager 132 and application 130 are running. By implementing this layer 136 on 'real' remote 104 and on computer 102 as an interface layer 138, window manager 116/132 and application sources 114/130 can be compiled for both the 'real' remote 104 and a computer 102.

Emulators are well known and used in the professional industry in the development phase to allow software development to start before the target hardware has been completed. Using the abstraction layers 136 and 138 the emulator, now as a consumer end-product, is an almost free byproduct of the 'real' remote's software development. The invention thus enables the end-user to program or re-program remote 104 more efficiently and ergonomically.

Note that the necessary software components for implementing the editor 118 and emulator 120 on computer 102 could be downloaded via Internet and as part of a service provided by the manufacturer. Within this context, reference is made to co-pending applications U.S. Ser. No. 09/160,490, now abandoned, and U.S. Ser. No. 09/189,535, pending, mentioned above. Also note that the configuring or re-configuring of programmable remote 104 could be outsourced to a specialist, possibly as part of above services, and that the result could be downloaded via Internet onto the end-user's computer 102 for testing or fine-tuning.

I claim:

1. An information processing system comprising:
    a computer;
    a user-programmable remote control device having a transmitter for control of electronic equipment and;
    a software application for running on the computer to enable a user to interactively configure an emulated version of the device on the computer and emulate operating the device on the computer to control the equipment via the computer, the application further comprising:
        a visual editor to permit the user to create and edit a customizable user-defined configuration of the device, and
        a graphical user interface for permitting the user to interact with the application such that the emulated version of the device having the user-defined configuration is defined on the computer and tested by the computer in controlling the electronic equipment prior to programming the device, said graphical user interface including a tree view for organizing functions of the device into a data structure;
    wherein the emulated version of the user-defined configuration on the computer is transferable to and runnable on the device for programming the device.

2. The system of claim 1, wherein
    the system comprises a further transmitter coupled to the computer; and
    the software application enables the user to control the equipment via the computer and the further transmitter.

3. The system of claim 1, wherein the device is capable of being programmed via the computer.

4. The system of claim 1, further comprising wherein the user-defined configuration is loaded from the computer to the device for programming the device.

5. A method of enabling emulation of a programmable remote control device having a customizable user-defined configuration for control of electronic equipment, the method comprising:
    enabling running an interactive software application on a computer to permit a user to create and edit customizable user-defined configuration of the device and for emulating manual operating the device on the computer by the user according to the user-defined configuration such that by permitting the user to interact with the application though a graphical user interface which includes a tree view for organizing functions of the device into a data structure, the emulated version of the device having the user-defined configuration is defined on the computer and tested by the computer in controlling the electronic equipment prior to programming the device; and
    enabling the application to generate control signals for control of the equipment according to the user-defined configuration.

6. The method of claim 5, further comprising enabling emulating a programming of the device through a software application.

7. The method of claim 6, comprising enabling downloading from the computer into the device, a result from the emulated programming.

8. The method as recited in claim 5, further comprising the step of providing an interface layer defined on both the device and the computer for permitting abstraction of hardware functions of the device to software functions of the computer.

9. The method of claim 5, further comprising the step of programming the device by loading the user-defined configuration from the computer to the device.

10. A software application for permitting a user to create and test a customizable user-defined configuration of a programmable controller directly on a computer comprising:
    a visual editor to permit the user to create and edit the customizable user-defined configuration of the controller for control of electronic equipment;
    an emulator to emulate operations of the programmable controller based on the user-defined configuration, wherein software of the emulator is capable of being run on the computer for operational use of the controller; and
    a graphical user interface to permit the user to interactively define on the computer and test using the computer the control of the electronic equipment by an emulated version of the programmable controller having the user-defined configuration prior to programming the configuration onto the controller, said graphical user interface including a tree view for organizing functions of the device into a data structure.

11. The system as recited in claim 10, further comprising an interface layer defined on both the controller and the computer for permitting abstraction of hardware functions of the controller to software functions of the computer.

12. The software application of claim 10, wherein the user-defined configuration is loaded onto the controller from the computer to program the controller.

13. A system for customizable programming and testing of a remote control device, comprising:
    a user-programmable remote control device having a transmitter for control of electronic equipment;
    a computer having a computer transmitter and a software application for running on the computer to enable an end-user to configure an emulated version of the remote control device on the computer and test operation of the remote control device prior to programming the remote control device, the software application further comprising:

a visual editor to permit the end-user to create and edit a user-defined configuration of the device for providing customization of device functions for control of the electronic equipment;

an emulator to form an emulated version of the device to emulate operations of the device based on the user-defined configuration, wherein software of the emulator is capable of being run on the computer for operational use of the controller; and a graphical user interface to permit the end-user to interactively define on the computer and test using the computer the control of the electronic equipment by the emulated version of the device having the user-defined configuration prior to programming the configuration onto the device, said graphical user interface including a tree view for organizing functions of the device into a data structure;

wherein the computer emulates operation of the device to control the electronic equipment via the computer transmitter such that by permitting the end-user to interact with the application on the computer through the graphical user interface, individual functions of the user-defined configuration of the device are defined on the computer and tested by the computer in controlling the electronic equipment prior to programming the device, the emulated version of the device having the user-defined configuration being transferable, programmable and runnable on the device to permit the customization of the device functions.

14. The system as recited in claim 13, further comprising an interface layer defined on both the device and the computer for permitting abstraction of hardware functions of the device to software functions of the computer.

15. The system of claim 13, further wherein the user-defined configuration is loaded onto the device from the computer to program the device.

* * * * *